United States Patent
Otto et al.

(10) Patent No.: US 12,407,694 B2
(45) Date of Patent: Sep. 2, 2025

(54) TRANSMISSION DEVICE FOR TRANSMITTING DATA

(71) Applicant: Siemens Mobility GmbH, Bayern (DE)

(72) Inventors: Christina Otto, Meunchen (DE); Heiko Patzlaff, Munich (DE); Martin Wimmer, Neubiberg (DE); Rainer Falk, Poing (DE); David Hingos, East Brunswick, NJ (US); Omer Metel, Anchorage, KY (US); Leandro Pfleger de Aguiar, Robbinsville, NJ (US)

(73) Assignee: Siemens Mobility GmbH, Bayern (DE)

( * ) Notice: Subject to any disclaimer, the term of this patent is extended or adjusted under 35 U.S.C. 154(b) by 213 days.

(21) Appl. No.: 17/784,497

(22) PCT Filed: Dec. 1, 2020

(86) PCT No.: PCT/EP2020/084036
§ 371 (c)(1),
(2) Date: Jun. 10, 2022

(87) PCT Pub. No.: WO2021/121948
PCT Pub. Date: Jun. 24, 2021

(65) Prior Publication Data
US 2022/0417268 A1    Dec. 29, 2022

(30) Foreign Application Priority Data
Dec. 19, 2019    (DE) ............ 10 2019 220 249.7

(51) Int. Cl.
*H04L 9/40*    (2022.01)
*H04L 12/46*    (2006.01)

(52) U.S. Cl.
CPC ...... *H04L 63/1416* (2013.01); *H04L 12/4625* (2013.01); *H04L 63/1425* (2013.01)

(58) Field of Classification Search
CPC .. H04L 63/1416; H04L 63/1425; H04L 12/46
See application file for complete search history.

(56) References Cited

U.S. PATENT DOCUMENTS

| | | | | |
|---|---|---|---|---|
| 2008/0049643 | A1* | 2/2008 | Arcese | ........... H04L 63/029 370/254 |
| 2015/0150112 | A1* | 5/2015 | Wiseman | ........... H04L 63/0209 726/11 |

(Continued)

FOREIGN PATENT DOCUMENTS

| | | |
|---|---|---|
| CN | 107683597 A | 2/2018 |
| CN | 108449310 A | 8/2018 |

(Continued)

OTHER PUBLICATIONS

Scott, Austin et al: "Tactical Data Diodes in Industrial Automation and Control Systems"; The SANS Institute, published: May 18, 2015; XP055550479,; 2015.

(Continued)

*Primary Examiner* — Lesa M Kennedy
(74) *Attorney, Agent, or Firm* — Schmeiser, Olsen & Watts, LLP

(57) ABSTRACT

A transmission device for transmitting data between a first network and a second includes: a first unidirectional transmission unit which is coupled to the first network and is configured to exclusively receive data transmitted from the first network to the transmission device, a second unidirectional transmission unit which is coupled to the second network and is configured to exclusively send data from the transmission device to the second network, and an identification unit which is located between the first unidirectional unit and the second unidirectional unit and which is configured to receive the data received by the first unidirectional transmission unit and to identify anomalies in the received data. The provided transmission device achieves the reliable, (Continued)

Figure 1:
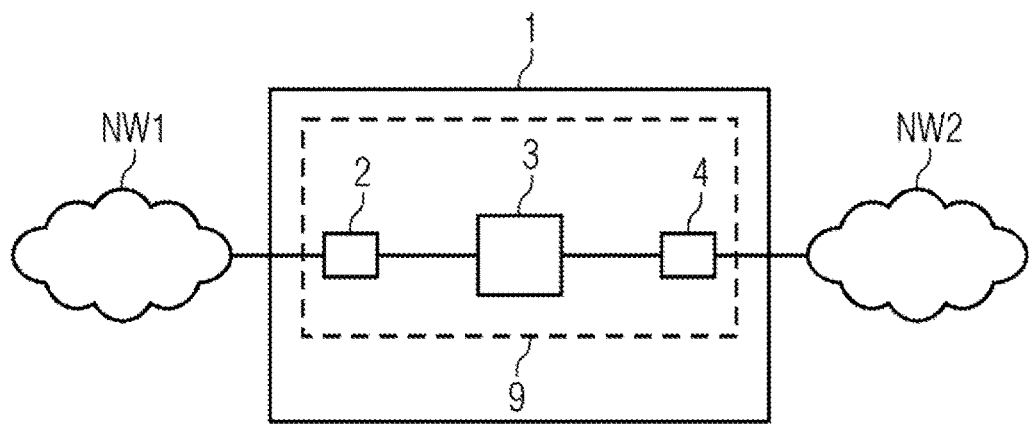

optimized identification of anomalies in the first network and increases security in the identification unit against manipulation and against attacks or intrusion attempts from the second network.

14 Claims, 1 Drawing Sheet

(56) References Cited

U.S. PATENT DOCUMENTS

| | | | |
|---|---|---|---|
| 2016/0330225 | A1 | 11/2016 | Kroyzer et al. |
| 2017/0070507 | A1* | 3/2017 | Leconte .............. H04L 12/4625 |
| 2018/0351914 | A1* | 12/2018 | Jobson ................ H04L 63/0263 |
| 2019/0349747 | A1* | 11/2019 | Dunn .................. H04L 63/0428 |
| 2020/0053833 | A1 | 2/2020 | Braun |
| 2020/0287921 | A1* | 9/2020 | Karin .................. H04L 63/1425 |
| 2021/0218659 | A1* | 7/2021 | Fujiki ................... H04L 43/065 |

FOREIGN PATENT DOCUMENTS

| | | | |
|---|---|---|---|
| CN | 109328453 | A | 2/2019 |
| CN | 109739203 | A | 5/2019 |
| CN | 110393002 | A | 10/2019 |
| EP | 3139548 | A1 | 3/2017 |
| KR | 20180028742 | A * | 3/2018 |
| WO | 2019099088 | A1 | 5/2019 |

OTHER PUBLICATIONS

PCT International Search Report and Written Opinion of the International Searching Authority mailed Feb. 23, 2021 corresponding to PCT International Application No. PCT/EP2020/084036 filed Dec. 1, 2020.

* cited by examiner

TRANSMISSION DEVICE FOR TRANSMITTING DATA

CROSS-REFERENCE TO RELATED APPLICATIONS

This application claims priority to PCT Application No. PCT/EP2020/084036, having a filing date of Dec. 1, 2020, which claims priority to DE Application No. 10 2019 220 249.7, having a filing date of Dec. 19, 2019, the entire contents both of which are hereby incorporated by reference.

FIELD OF TECHNOLOGY

The following relates to a transmission device for transmitting data between a first network and a second network.

BACKGROUND

Secure communication between a security-critical network, such as for example a production network or a railway safety network, and an open network, such as for example a local area network or the Internet, is conventionally accomplished in particular by employing transmission devices, such as data diodes or firewalls, in order to allow unidirectional data transmission between the security-critical network and the open network. These transmission devices are for example designed to ensure that not just any data may be conveyed from the open network to the security-critical network and are in particular furthermore designed to protect the security-critical network from attacks and intrusion attempts.

SUMMARY

Against this background, an aspect relates to provide an improved transmission device.

According to a first aspect, a transmission device for transmitting data between a first network and a second network is proposed. The transmission device comprises:
a first unidirectional transmission unit, which is couplable to the first network and designed to exclusively receive data transmitted from the first network to the transmission device,
a second unidirectional transmission unit, which is couplable to the second network and designed to exclusively send data from the transmission device to the second network, and
a detection unit, which is arranged between the first unidirectional transmission unit and the second unidirectional transmission unit and designed to receive the data received by the first unidirectional transmission unit and to detect anomalies in the received data.

Since, on the one hand, the first unidirectional transmission unit is designed to exclusively receive data transmitted from the first network to the transmission device and, on the other hand, the second unidirectional transmission unit is designed to exclusively send data from the transmission device to the second network, a demilitarized zone (DMZ) that comprises the detection unit is advantageously formed between the first and the second unidirectional transmission unit in the transmission device. The demilitarized zone is in particular a neutral area in the transmission device that is insulated from the first network and the second network and is formed between the first and the second unidirectional transmission unit.

As a result of the detection unit being arranged in the DMZ in a manner insulated from the first network and the second network, an attack or intrusion attempt by an attacker on the detection unit cannot come from the second network. This is in particular because the second unidirectional transmission unit exclusively permits a data transmission from the second unidirectional transmission unit to the second network and not vice versa. Tamper protection for the detection unit is therefore increased, which increases security for the data transmission between the first network and the second network.

The transmission device provided furthermore allows data transmitted from the first network to the transmission device to be able to be monitored and analyzed by means of the detection unit so as thus to be able to detect anomalies in the first network and intrusion attempts on the first network. In parallel, the transmission device provided allows the first network to be isolated from the second network in order to ensure that not just any data may be conveyed from the second network to the first network and that no unauthorized access, for example for the purpose of tampering with the first network, is effected from the second network to the first network. This advantageously leads to reliable and optimized detection of anomalies in the first network and to an increase in tamper protection for the transmission device, in particular the detection unit.

Additionally, the formation of the DMZ and the arrangement of the first unidirectional transmission unit ensure that no security-critical data may be transmitted to the first network by way of the first unidirectional transmission unit in the event of a successful attack on the transmission device. The first unidirectional transmission unit and the DMZ thus allow isolation with no reaction between the first network and the transmission device and between the first network and the second network. Security for the data transmission between the first network and the second network is therefore increased.

The transmission device is in particular in the form of an edge device, such as a unidirectional gateway or a unidirectional data diode. The unidirectional data diode is in particular a one-way communication apparatus that allows the first network and the second network to be isolated with no physical reaction. There is isolation with no "physical" reaction in particular if the isolation with no reaction is produced by means of physical elements in the unidirectional data diode, such as for example the first and the second unidirectional transmission unit, which connect the first network and the second network in such a way that a communication connection exists exclusively from the first network toward the second network, but there is no physical connection from the second network to the first network. The unidirectional gateway is in particular implemented in hardware and/or in software and is designed to make a unidirectional connection between the first and the second network. The unidirectional gateway allows the first and the second network to be isolated with no physical or logical reaction. The term isolation with no "logical" reaction is understood in the present case to mean in particular when the isolation with no reaction is provided by applying algorithms if the gateway is implemented in software.

The first and the second unidirectional transmission unit are arranged within the transmission device in such a way that the first unidirectional transmission unit is designed to exclusively receive data from the first network, while the second unidirectional transmission unit is designed to exclusively send data to the second network. In other words, the first unidirectional transmission unit is in particular not designed to send data to the first network, while the second unidirectional transmission unit is not designed to receive data from the second network.

The term "unidirectionally" is understood in the present case to mean that a transmission of data between two networks or devices takes place exclusively in one direction, for example from the first network unidirectionally toward the transmission device and from the transmission device unidirectionally toward the second network.

In particular, the first and the second unidirectional transmission unit may comprise one or more network ports. A network port is in particular in the form of a physical network port. The physical network port comprises an RJ-45 connection, an M12 connection or a single-pair Ethernet connection, in order to be connected or coupled to the first network or the second network in each case. A network port may also be a part of a network address that allows the association of TCP (Transmission Control Protocol) connections and UDP (User Datagram Protocol) connections and data packets with servers and/or clients arranged in the first and/or second network.

The detection unit in particular comprises an intrusion detection system. The intrusion detection system (IDS) is a security technology that detects unauthorized intrusion into a network, for example if malware uses so-called exploit codes to exploit security loopholes in a system. The intrusion detection system in particular comprises a network intrusion detection system (NIDS). An IDS or an NIDS can be used to supervise the relevant network, for example the first network, and to effectively search for anomalies and/or intrusion attempts.

According to one embodiment, the first unidirectional transmission unit and the second unidirectional transmission unit are each implemented in hardware at least in the form of a network TAP or a unidirectional data diode.

This hardware implementation in the form of a network TAP or a unidirectional data diode achieves the unidirectionality relating to the data transmission of the first and the second unidirectional transmission unit, that is to say the unidirectional data transmission from the first network to the transmission device by way of the first unidirectional transmission unit and the unidirectional data transmission from the second unidirectional transmission unit to the second network, in physical form. As a result, it is impossible for an attacker to be able to access the transmission device, in particular the detection unit, from the second network and to be able to tamper with said transmission device. This increases protection from tamper attempts with respect to the detection unit, thereby increasing the integrity of the overall system comprising the first network, the second network and the transmission device, and in particular security for the data transmission between the first and the second network.

The network TAP (network-test access point) is in particular in passive or active form. A passive network TAP may also be referred to as a so-called "data capture unit" (DCU). A first unidirectional transmission unit that is in the form of a passive unidirectional network TAP is designed to monitor the network traffic from the first network to the transmission device and to ensure the unidirectionality relating to the data transmission from the first network to the transmission device. By way of example, a network TAP achieves the unidirectionality relating to the data transmission by way of a physical wiring of the network TAP.

The unidirectional data diode is in particular in optical form. The unidirectionality relating to the data transmission of the optical unidirectional data diode is provided by way of its internal physical design.

The second unidirectional transmission unit may furthermore also comprise a physical serial interface, such as an RS485 interface. In this case, in particular in a software implementation, the unidirectionality relating to the data transmission is achieved by way of a protocol break and/or is achieved by virtue of a channel that is used being set up for data transmission exclusively unidirectionally from the transmission device to the second network by means of algorithms. This form of implementation is in particular associated with low manufacturing complexity. Furthermore, the unidirectionality relating to the data transmission in a hardware implementation of the RS485 interface is achieved by way of a physical adaptation, by way of a physical wiring of the RS485 interface that exclusively allows a unidirectional data transmission from the transmission device to the second network.

The attack may be a hardware attack and/or a software attack, in particular a hacker attack. A software attack is in particular an attack attempt and/or an intrusion attempt on the transmission device from the second network. A hardware attack in particular attempts to tamper with the physical structure of the respective transmission unit.

According to a further embodiment, the anomalies detectable by the detection unit comprise a first anomaly type and a second anomaly type, the first anomaly type differing from the second anomaly type.

The detection unit advantageously allows different anomaly types to be detected, such as the first and the second anomaly type. This leads to reliable and optimized detection of anomalies in the first network, thereby increasing security for the data transmission between the first network and the second network.

The first anomaly type that the detection unit detects on the received data or on currently received data is detected in particular if the data currently received from the first network comprise an irregularity or a divergence in comparison with older received data. By way of example, an irregularity may be a communication taking place between a subscriber in the first network that is known to the detection unit and an unknown subscriber in the first network, and/or an unusual network activity by a subscriber in the first network.

The second anomaly type that the detection unit detects on the received data or on currently received data may be in particular subsumed under the term "exploit detection". "Exploit detection" involves the received data in the first network being examined by means of the detection unit for potentially harmful data packets, such as so-called exploit codes and communication cycles.

According to a further embodiment, the transmission device comprises at least one CPU, which is arranged between the first unidirectional transmission unit and the second unidirectional transmission unit and in which the detection unit and additionally a modeling unit are implemented, the modeling unit being designed to provide a model containing network-specific data from the first network.

The CPU (central processing unit) is in particular produced within the DMZ.

Network-specific data comprise measured values, such as for example pressure and/or temperature of subscribers in the first network, at least one number T of subscribers or a network topology of the subscribers in the first network, operating states of subscribers in the first network and/or a technical process performed by at least one subscriber in the first network. Network-specific data may furthermore comprise IP addresses and/or network ports of the subscribers and information about network protocols used in the first network, such as TCP, UDP, HTTP (Hypertext Transfer Protocol) and/or OPC UA (OPC Unified Architecture).

The first network and the second network each in particular comprise one or more subscribers. The multiple subscribers are connected to one another and thereby form the respective network. A subscriber is for example a computer, such as a server, a client or a router.

The model in particular reproduces the first network. The more network-specific data are made available to the modeling unit and the more current these network-specific data made available are, the better the model of the first network that the modeling unit provides is.

According to a further embodiment, the modeling unit is designed to provide the model on the basis of preconfiguration data of the first network and to make the thus provided model available to the detection unit.

Preconfiguration data are data that comprise a specific network topology of subscribers in the first network and are made available to the modeling unit for example by way of a serial interface of the transmission device. The preconfiguration data are in particular used to provide a first initial model by way of the modeling unit.

According to a further embodiment, the modeling unit is designed to make the model available at least on the basis of data received from the first network by way of the first unidirectional transmission unit at a specific time and/or on the basis of data received from the first network by way of the first unidirectional transmission unit during a specific period and to make the thus provided model available to the detection unit.

The specific time comprises at least one time after the transmission device is switched on and the transmission device is connected to the first network by way of the first unidirectional transmission unit for the first time. By way of example, a plug-and-play function is used to read the first network at the time of connection and to provide the model by way of the modeling unit on the basis of the network-specific data of the first network that are read. It is in particular also conceivable for the transmission device, comprising the detection unit, to be easily able to be connected to one or to further security-critical networks by way of the plug-and-play function and therefore for the network-specific data of the one or the further security-critical networks to be able to be read.

The specific period comprises a longer period after the transmission device is switched on and the transmission device is connected to the first network by way of the first unidirectional transmission unit for the first time, of, by way of example, several minutes, hours, days, weeks or months, that is to say in particular a period during the operation of the transmission device.

This specific period may also be referred to as a learning phase of the transmission device. The length of the learning phase is time- and/or data-dependent. A time-dependent learning phase is terminated after a specific period has elapsed, for example. A data-dependent learning phase is terminated in particular after a specific volume of data received from the first network has been reached. After the specific period has elapsed or the learning phase has been terminated, the model is subsequently provided on the basis of the network-specific data ascertained during this specific period. Subsequently, after the model has been provided, it may be made available to the detection unit for the purpose of analyzing the received data of the first network, for example. The time phase after the model has been provided, that is to say the phase after the learning phase in which the detection unit is designed to analyze the received data for anomalies, may also be referred to as the analysis phase. If the first network is reconfigured, for example after a new subscriber has been added, the transmission device may be restarted and subsequently a new learning phase begun. The transmission device comprises a switch for switching on and/or switching off the learning phase and/or the analysis phase.

According to a further embodiment, the modeling unit is designed to provide the model by means of preconfiguration data and on the basis of data received from the first network by way of the first unidirectional transmission unit at a specific time and/or on the basis of data received from the first network by way of the first unidirectional transmission unit during a specific period and to make the thus provided model available to the detection unit.

This embodiment has the advantage that the model is provided on the basis of a comprehensive and current database, namely the preconfiguration data and the data received from the first network by way of the first unidirectional transmission unit at a specific time and/or the data received from the first network by way of the first unidirectional transmission unit during a specific period. This improved database allows an improved model to be provided by the modeling unit. The model provided may also be updated with more current network-specific data from the first network at regular intervals and subsequently made available to the detection unit. In this case, the transmission device is in particular designed to execute the detection unit and the modeling unit in parallel. This embodiment therefore leads to reliable and optimized detection of anomalies in the first network, thereby increasing security for the data transmission between the first network and the second network.

According to a further embodiment, the detection unit is designed to compare the data received by the first unidirectional transmission unit with the network-specific data of the provided model in order to obtain a comparison result, the detection unit being designed to use the comparison result obtained to deduce whether there is at least one anomaly in the received data.

The comparison result obtained is used to deduce whether there is an anomaly in particular by way of threshold value formation for the data received by the detection unit and/or comparison of the threshold value with the network-specific data of the model provided. Furthermore, it is possible to deduce whether there is an anomaly by stipulating at least one range containing admissible network-specific data in which there is an indication of which network-specific data obtained are still admissible.

According to a further embodiment, the transmission device is designed so as, if there is the at least one anomaly in the received data, to use the second unidirectional transmission unit to transmit an error report comprising the detected anomaly to a monitoring unit that is arranged in the second network or is connected thereto.

Since only an error report is transmitted to the second network, in particular to the monitoring unit, when there is an anomaly, the data traffic and/or network traffic or the volume of network data between the first network and the second network is advantageously significantly reduced. The transmission device provided advantageously allows the data received from the first network to already be analyzed locally or in situ in the transmission device by means of the detection unit. It is therefore not necessary to transmit all of the data traffic from the first network to a back end, such as the second network, and/or to the monitoring unit for the purpose of analysis and for the purpose of processing.

An error report is in particular a message. The message is transmitted to the monitoring unit and/or a computer, such as a server or a client, that is connected to the monitoring unit. The message may also be transmitted to the transmission device itself. The monitoring unit may be in the form of an MS SP (managed security service provider).

According to a further embodiment, the detection unit and the modeling unit are each produced in software in the form of a security application.

The security applications are in particular arranged in the DMZ, in the CPU, in a manner insulated from the first and the second network. This leads to an increase in tamper protection for the detection unit and the modeling unit, thereby increasing security for the data transmission between the first and the second network.

The transmission device may comprise further security applications designed for example for data compression or data filtering of the data received from the first network. A security application or an application is in particular a non-operating-system-relevant computer program.

According to a further embodiment, the transmission device is designed to use a network switch arranged between the first network and the first unidirectional transmission unit to receive the data from the first network, at least one input of the network switch being connected to the first network for the purpose of transmitting data and a mirror port in the form of an output of the network switch being connected to the first unidirectional transmission unit for the purpose of transmitting data.

The use of a network switch having a mirror port advantageously allows all of the data traffic of the first network to be provided for the transmission device by way of the first unidirectional transmission unit. This advantageously allows the transmission device to obtain, monitor and analyze the data traffic of any subscriber in the first network. This increases reliability for the detection of an anomaly in the first network and hence security for the processing of data in the first network and the transmission device.

In particular, the first network and the network switch have a first connecting section arranged between them, the network switch and the transmission device have a second connecting section arranged between them and the transmission device and the second network have a third connecting section arranged between them. The first connecting section in particular makes a connection between the first network and the network switch. The second connecting section makes a connection between the network switch and the transmission device by way of the first unidirectional transmission unit. The third connecting section for example makes a connection between the second network and the transmission device by way of the second unidirectional transmission unit. The first, second and/or third connecting section is in particular wired, for example in the form of at least one copper line or an aluminum line, and/or optical in the form of at least one fiber-optic line. The network switch is in particular in the form of a switch.

The mirror port of the network switch is used in particular to mirror the network traffic of the first network so as to provide some or all of the data and/or network traffic of the first network to the transmission device by way of the first unidirectional transmission unit.

According to a further embodiment, the transmission device is designed to perform a transmission of data between the first network and the second network in a transmission layer, Layer 2 based on the OSI/ISO layer model.

According to a further embodiment, the first network comprises a control network, in particular a production network or a railway safety network, and the second network comprises a diagnostic network, a local area network or the Internet.

The first network is in particular in the form of a security-critical network, while the second network is in the form of an open network. The first network may also be referred to as a network having a high security requirement, while the second network is referred to as a network having a low security requirement.

A production network is in particular used in a production installation. The production installation in particular comprises multiple machines and computers connected to one another by way of the production network. A railway safety network comprises control and safety engineering for a rail infrastructure. The control network furthermore in particular comprises a road safety network comprising control and safety engineering for a road infrastructure.

A local area network comprises a LAN (local area network) and/or a WLAN (wireless local area network), for example.

According to a further embodiment, at least the first unidirectional transmission unit, the second unidirectional transmission unit and the detection unit are implemented in a shared package.

The components presented in this embodiment, including the transmission device itself, are therefore implemented in a shared package. A package or a shared package is in particular in the form of a package of a processor or of a computer chip, for example in the form of an integrated circuit (IC). Furthermore, a package is in the form of a shared package of a device or for example in the form of a shared implementation on an FPGA (field programmable gate array).

According to a further embodiment, the first unidirectional transmission unit and the second unidirectional transmission unit are each implemented in software in the form of a unidirectional firewall.

In the case of a software implementation, the respective unit, such as for example the first unidirectional transmission unit, may be in the form of a computer program product (non-transitory computer readable storage medium having instructions, which when executed by a processor, perform actions), in the form of a function, in the form of a routine, in the form of part of a program code or in the form of an executable object.

The software implementation by means of a firewall achieves the unidirectionality relating to the data transmission of the first and/or the second transmission unit in logical form. This means that the unidirectionality relating to the data transmission is provided by applying algorithms by means of which the unidirectional firewall is programmed in such a way that only a unidirectional data transmission by the first and the second unidirectional transmission unit is possible in each case.

Further possible implementations of embodiments of the invention comprise combinations, which are also not explicitly cited, of features or embodiments described above or below for the exemplary embodiments. In this case, a person skilled in the art will also add individual aspects to the respective basic form of embodiments of the invention as improvements or additions.

BRIEF DESCRIPTION

Figure 2:
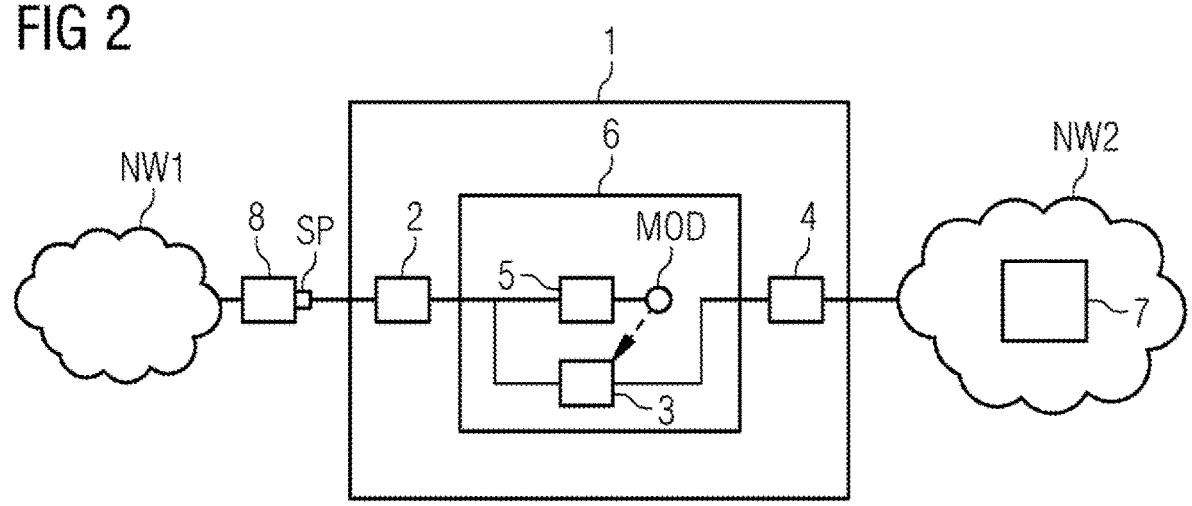

Some of the embodiments will be described in detail, with reference to the following figures, wherein like designations denote like members, wherein:

FIG. 1 shows a schematic block diagram of a first exemplary embodiment of a transmission device for transmitting data; and FIG. 2 shows a schematic block diagram of a second exemplary embodiment of a transmission device for transmitting data.

DETAILED DESCRIPTION

In the figures, elements that are the same or that have the same function have been provided with the same reference signs, unless indicated otherwise.

FIG. 1 shows a schematic block diagram of a first exemplary embodiment of a transmission device 1 for transmitting data between a first network NW1, for example comprising a production network, and a second network NW2, for example comprising a local area network. This transmission of data is in particular performed in a transmission layer, Layer 2 based on the OSI/ISO layer model. In a further embodiment, the first network NW1 may comprise a railway safety network, while the second network NW2 is the Internet.

The transmission device 1 comprises a first unidirectional transmission unit 2, which is couplable to the first network NW1, a second unidirectional transmission unit 4, which is couplable to the second network NW2, and a detection unit 3, which is arranged between the first unidirectional transmission unit 2 and the second unidirectional transmission unit 4.

In the first embodiment, the transmission device 1 comprising the first unidirectional transmission unit 2, the second unidirectional transmission unit 4 and the detection unit 3 is implemented in a shared package 9.

The first unidirectional transmission unit 2 is designed to exclusively receive data transmitted from the first network NW1 to the transmission device 1, while the second unidirectional transmission unit 4 is designed to exclusively send data from the transmission device 1 to the second network NW2.

In the first embodiment in FIG. 1, the first unidirectional transmission unit 2 and the second unidirectional transmission unit 4 are each implemented in hardware in the form of a network TAP. In a further embodiment, the first and the second unidirectional transmission unit 2, 4 may each be implemented in hardware in the form of a unidirectional data diode or may each be implemented in software in the form of a unidirectional firewall.

Furthermore, the detection unit 3 is designed to receive the data received by the first unidirectional transmission unit 2 and to detect anomalies in the received data. In this case, an anomaly detected by the detection unit 3 in particular comprises different anomaly types, such as a first anomaly type and a second anomaly type.

FIG. 2 shows a schematic block diagram of a second exemplary embodiment of a transmission device 1 for transmitting data.

The transmission device 1 in this case comprises a CPU 6 that is arranged between the first unidirectional transmission unit 2 and the second unidirectional transmission unit 4 and in which the detection unit 3 and additionally a modeling unit 5 are implemented. The modeling unit 5 is designed to provide a model MOD containing network-specific data from the first network NW1. The detection unit 3 and the modeling unit 5 are in this case each produced in software in the form of a security application, for example.

The modeling unit 5 is in particular designed to provide the model MOD on the basis of preconfiguration data of the first network NW1 and/or on the basis of data received from the first network NW1 by way of the first unidirectional transmission unit 2 at a specific time and/or on the basis of data received from the first network NW1 by way of the first unidirectional transmission unit 2 during a specific period. The thus provided model MOD is subsequently made available to the detection unit 3.

In this second embodiment, the detection unit 3 is designed to compare the data received by the first unidirectional transmission unit 2 with the network-specific data of the provided model MOD in order to obtain a comparison result. The detection unit 3 is then designed to use the comparison result obtained to deduce whether there is at least one anomaly in the received data. If there is an anomaly in this case, the transmission device 1 is designed to transmit an error report comprising the detected anomaly by way of the second unidirectional transmission unit 4 to a monitoring unit 7 arranged in the second network NW2. In a further embodiment, the monitoring unit 7 may also be connected to the second network NW2.

In FIG. 2, a network switch 8 is furthermore arranged between the first network NW1 and the first unidirectional transmission unit 2.

The transmission device 1 is designed in this instance to use the network switch 8 to receive the data from the first network NW1. At least one input of the network switch 8 is connected to the first network NW1 for the purpose of transmitting data. A mirror port SP for transmitting data, which is in the form of an output of the network switch 8, is connected to the first unidirectional transmission unit 2.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A transmission device for transmitting data between a first network and a second network, the transmission device comprising:
   a first unidirectional transmission unit, which is couplable to the first network and designed to exclusively receive data transmitted from the first network to the transmission device;
   a second unidirectional transmission unit, which is couplable to the second network and designed to exclusively send data from the transmission device to the second network;
   a detection unit, which is arranged between the first unidirectional transmission unit and the second unidirectional transmission unit and designed to receive the data received by the first unidirectional transmission unit and to detect anomalies in the received data; and
   a modeling unit arranged between the first unidirectional transmission unit and the second unidirectional transmission unit, wherein the modeling unit is designed to provide a model on a basis of preconfiguration data comprising a specific network topology of subscribers in the first network, and wherein the modeling unit is designed to make the model available to the detection unit so that the received data could be analyzed by the detection unit, wherein a unidirectional communication connection in the transmission device exists exclusively from the first network to the second network and communication in the transmission device from the second network to the first network cannot occur.

2. The transmission device as claimed in claim 1, wherein the first unidirectional transmission unit and the second unidirectional transmission unit are each implemented in hardware at least in the form of a network test access point (TAP) or a unidirectional data diode.

3. The transmission device as claimed in claim 1, wherein the anomalies detectable by the detection unit comprise a first anomaly type and a second anomaly type, the first anomaly type differing from the second anomaly type.

4. The transmission device as claimed in claim 3, wherein the first unidirectional transmission unit and the second unidirectional transmission unit are each implemented in software in the form of a unidirectional firewall.

5. The transmission device as claimed in claim 1, wherein the modeling unit is designed to provide the model by means of preconfiguration data and on a basis of data received from the first network by way of the first unidirectional transmission unit at a specific time and/or on a basis of data received from the first network by way of the first unidirectional transmission unit during a specific period and to make the provided model available to the detection unit.

6. The transmission device as claimed in claim 1, wherein the detection unit is designed to compare the data received by the first unidirectional transmission unit with the network-specific data of the provided model in order to obtain a comparison result, the detection unit being designed to use the comparison result obtained to deduce whether there is at least one anomaly in the received data.

7. The transmission device as claimed in claim 6, wherein the transmission device is designed so as, if there is the at least one anomaly in the received data, to use the second unidirectional transmission unit to transmit an error report comprising the detected anomaly to a monitoring unit that is arranged in the second network or is connected thereto.

8. The transmission device as claimed in claim 1, wherein the detection unit and the modeling unit are each produced in software in the form of a security application.

9. The transmission device as claimed in claim 1, wherein the transmission device is designed to use a network switch arranged between the first network and the first unidirectional transmission unit to receive the data from the first network, at least one input of the network switch being connected to the first network for the purpose of transmitting data and a mirror port in the form of an output of the network switch being connected to the first unidirectional transmission unit for the purpose of transmitting data.

10. The transmission device as claimed in claim 1, wherein the transmission device is designed to perform a transmission of data between the first network and the second network in a transmission layer, Layer 2 based on the OSI/ISO layer model.

11. The transmission device as claimed in claim 1, wherein the first network comprises a control network, in particular a production network or a railway safety network, and the second network comprises a diagnostic network, a local area network or the Internet.

12. The transmission device as claimed in claim 1, wherein at least the first unidirectional transmission unit, the second unidirectional transmission unit and the detection unit are implemented in a shared package.

13. A transmission device for transmitting data between a first network and a second network, the transmission device comprising:
a first unidirectional transmission unit, which is couplable to the first network and designed to exclusively receive data transmitted from the first network to the transmission device;
a second unidirectional transmission unit, which is couplable to the second network and designed to exclusively send data from the transmission device to the second network;
a detection unit, which is arranged between the first unidirectional transmission unit and the second unidirectional transmission unit and designed to receive the data received by the first unidirectional transmission unit and to detect anomalies in the received data; and
a modeling unit arranged between the first unidirectional transmission unit and the second unidirectional transmission unit, and designed to make a model available on a basis of data received from the first network by way of the first unidirectional transmission unit during a specific period consisting of a learning phase of the transmission device and to make the model available to the detection unit for analyzing the received data from the first network for anomalies in an analysis phase, and
wherein a unidirectional communication connection in the transmission device exists exclusively from the first network to the second network and communication in the transmission device from the second network to the first network cannot occur.

14. The transmission device as claimed in claim 13, wherein the transmission device comprises a switch for switching on and switching off the learning phase and the analysis phase.

* * * * *